United States Patent [19]

Brown

[11] 3,915,292

[45] Oct. 28, 1975

[54] VIBRATORY FEEDER WITH NATURAL FREQUENCY ADJUSTMENT

[75] Inventor: William R. Brown, Blairsville, Pa.

[73] Assignee: FMC Corporation, San Jose, Calif.

[22] Filed: Sept. 16, 1974

[21] Appl. No.: 506,388

[52] U.S. Cl. ............................ 198/220 CA; 221/200
[51] Int. Cl.[2] ........................................ B65G 27/08
[58] Field of Search ............. 221/200; 198/220 CA, 198/220 DC; 267/160, 48

[56] References Cited
UNITED STATES PATENTS

| | | | |
|---|---|---|---|
| 2,935,177 | 5/1960 | Morris | 198/220 CA |
| 3,159,269 | 12/1964 | Pirrello | 198/220 CA |

*Primary Examiner*—Robert B. Reeves
*Assistant Examiner*—John P. Shannon
*Attorney, Agent, or Firm*—J. F. Verhoeven; C. E. Tripp

[57] ABSTRACT

An article feeder having a frame mounted on a base is disclosed. A container which receives and dispenses articles is secured to the frame. The frame and container assembly constitute one mass of a two mass system, and the base constitutes the other mass of the system. Several sets of main leaf springs are secured by clamps between the frame and the base to support the frame and container for rotational oscillation by a motor mounted on the base. A set of auxiliary leaf springs, smaller than the main leaf springs, is secured to the clamps of each set of main leaf springs and acts in parallel with each set of main leaf springs to provide the total spring coupling between the frame and container assembly and the base. The auxiliary leaf springs are added or removed individually to change the torsional natural frequency of the two mass system in small increments without disturbing the sets of main leaf springs.

5 Claims, 4 Drawing Figures

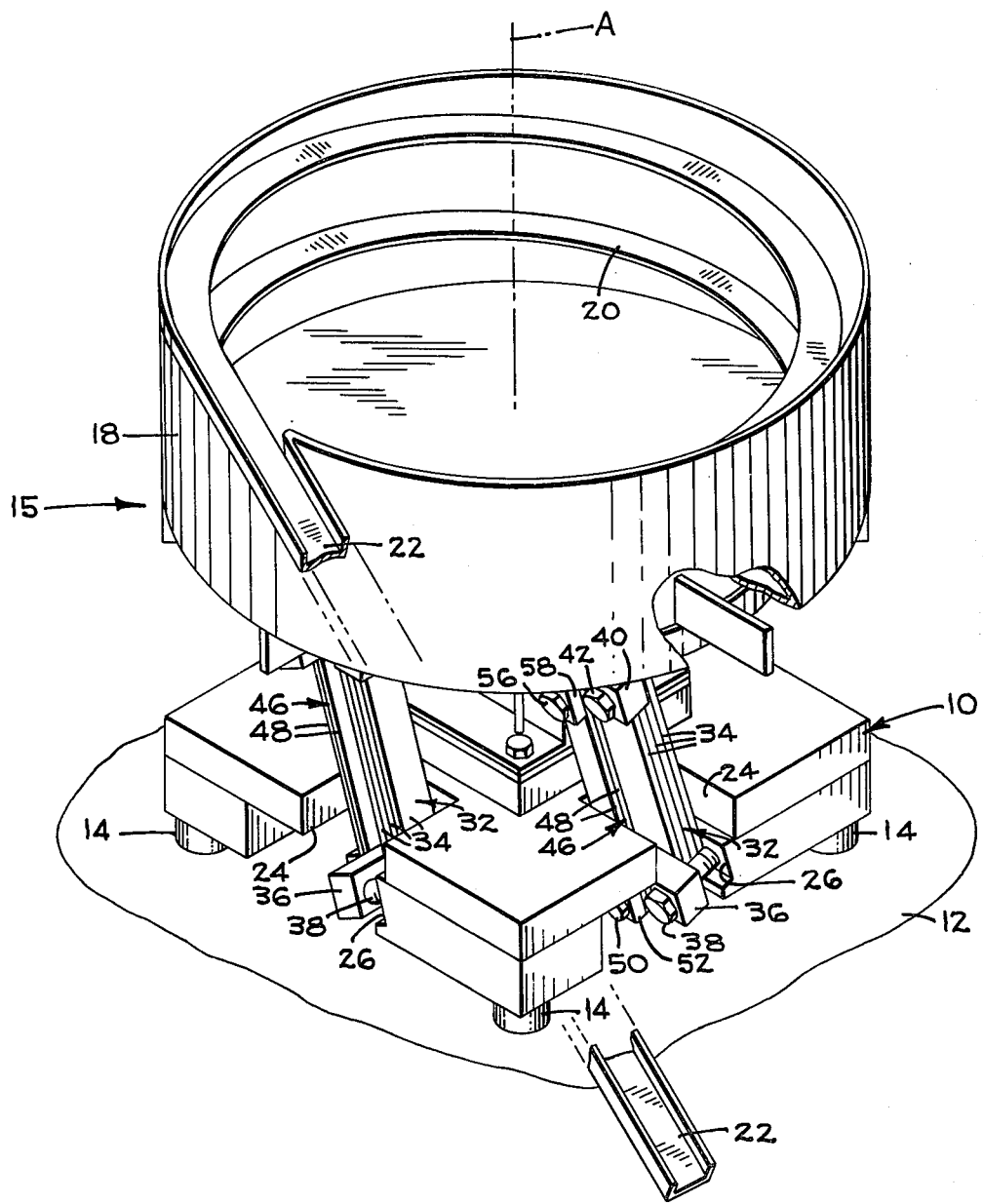
FIG_1

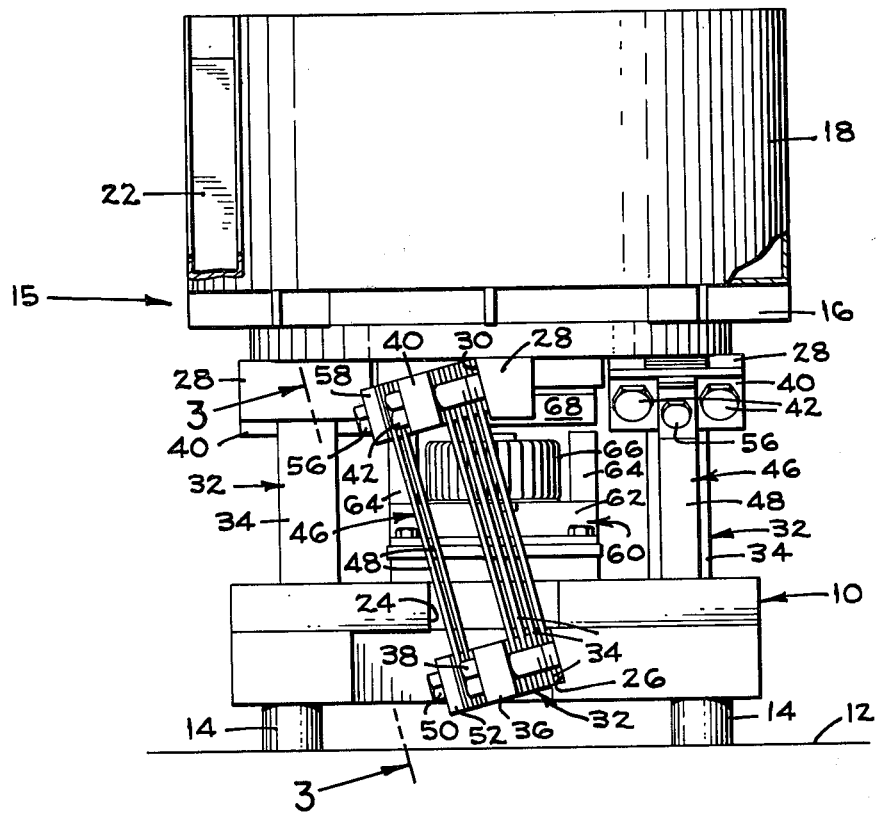
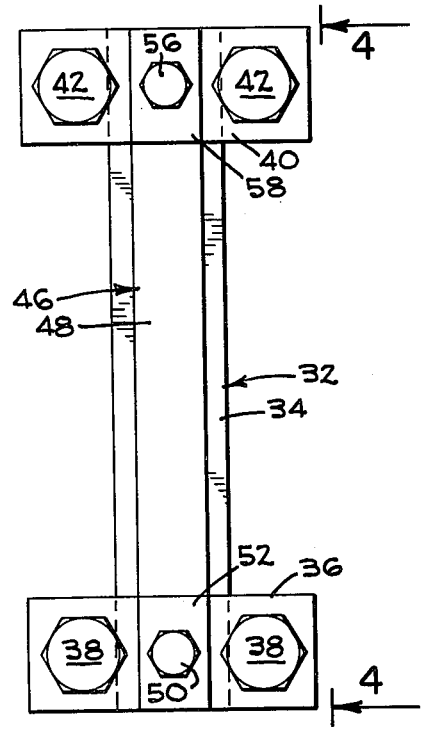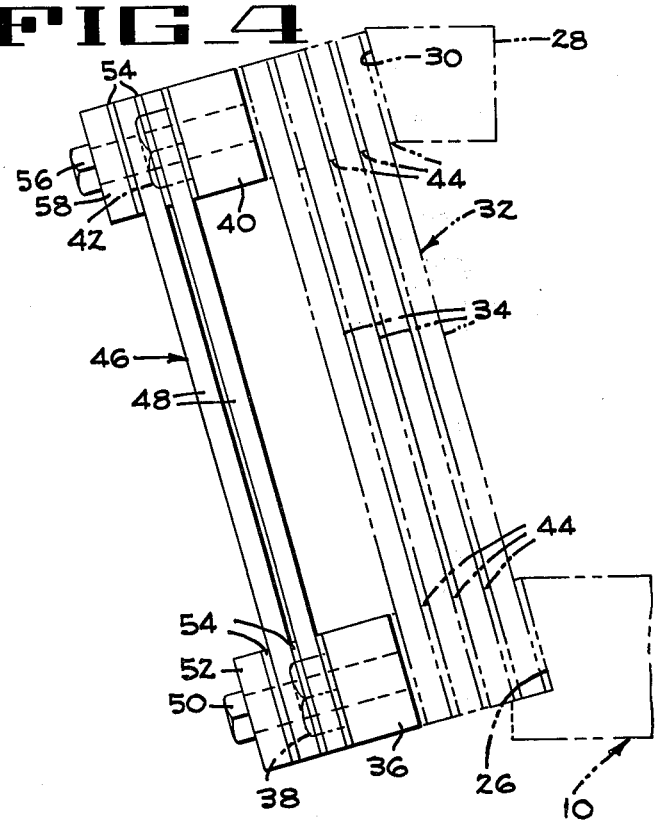

VIBRATORY FEEDER WITH NATURAL FREQUENCY ADJUSTMENT

BACKGROUND OF THE INVENTION

1. Field of the Invention

The present invention relates to two-mass vibratory feeders, and, more particularly, to mechanism for changing the natural frequency of the feeder.

2. Description of the Prior Art

In a vibratory feeder, a frame, which carries an article or material container, is supported by leaf springs secured to a base. The base, springs and the frame (with container) constitute a spring-coupled two-mass system in which the frame and container (which constitute one mass of the system) is oscillated by a motor with respect to the base (which constitutes the other mass of the system). The motor creates a vibratory driving force of a predetermined frequency, and it is desirable to have the natural frequency of the spring-coupled two-mass system near the frequency of the motor to minimize the power consumed in the feeding operation.

It is therefore desirable to be able to adjust the natural frequency of the system in order to "tune" the two-mass system for most efficient operation. One previously known method of adjusting the frequency of the system is to modify the spring system.

Usually, the spring system by which the frame is mounted to the base consists of sets of leaf springs clamped to both the frame and the base. The removal (or addition) of a leaf from a set is not only difficult and awkward, because the springs support the frame and bowl, but it frequently results in too great a change in the frequency of the system.

Accordingly, it is one object of the present invention to provide an improvement in a spring system for a feeder so that the spring system can be easily modified to change the natural frequency of the feeder.

It is another object of the present invention to provide an improvement in a spring system for a feeder so that adjustment of the frequency of the feeder in small increments can easily be made.

It is yet another object of the present invention to provide an improved spring system for a spring-coupled two-mass vibratory feeder in which fine adjustment of the torsional natural frequency of the system can be easily effected.

SUMMARY OF THE INVENTION

In accordance with the present invention, auxiliary leaf springs are connected between the frame and the base of a two-mass vibratory feeder, in parallel relation to the main springs of the feeder. In the preferred embodiment of the invention, wherein the frame is supported with respect to the base by a plurality of sets of main leaf springs which are clamped to the base and the frame, an auxiliary set of leaf springs is provided for each set of main springs. Each auxiliary set of leaf springs is connected to the clamps which hold the main springs, but by different bolts than those that secure the main springs so that leaf springs of the auxiliary set can be individually added or removed without disturbing the sets of main springs. The addition or removal of an auxiliary spring will change the frequency of the feeder, and the auxiliary springs are significantly smaller than the main springs so that the frequency of the feeder can be changed in small increments. Thus, the auxiliary springs define vernier springs which act in parallel with the main springs to provide the total spring coupling of the spring-coupled two-mass system. At the same time, the vernier springs permit adjustment of the natural torsional frequency of the system for optimum feeding conditions when the feeder is manufactured or serviced.

BRIEF DESCRIPTION OF THE DRAWINGS

FIG. 1 is a view in perspective of an article feeder embodying the mechanism of the present invention.
FIG. 2 is a side view of the feeder of FIG. 1.
FIG. 3 is a view taken on the line 3—3 of FIG. 2.
FIG. 4 is a view taken on the lines 4—4 of FIG. 3.

DESCRIPTION OF THE PREFERRED EMBODIMENTS

There is shown in FIG. 1 a spring-coupled two-mass vibratory article feeder having a substantially square base 10 supported on a rigid working surface 12, such as a floor or table, by means of resilient isolating pads 14 secured at each corner to the bottom surface of the base. The feeder includes a frame 16 (FIG. 2) on which a container 18 is secured. The container receives the articles (not shown) to be dispensed, and, as is well understood in the art, the articles are fed, as on track 20, successively out of the container 18 and down the discharge chute 22 when the container is vibrated about a central axis A thereof.

The base 10 constitutes one mass of the spring-coupled, two-mass vibratory article feeder, and the assembly 15 of frame 16 and container 18 constitute the other mass of the system. The base 10 has four recesses 24 extending inwardly from the four sides, respectively, each recess defined on one side by a seat 26. The frame has four blocks 28 depending therefrom, each block having a seat 30 thereon.

The base 10 and assembly 15 of frame and container are coupled by resilient means in the form of leaf springs. Four sets 32 of main leaf springs 34 are mounted between the base 10 and the frame 16. Each set (illustrated with four leaf springs) is clamped, at one end, to the seat 26 in the base by means of a clamp bar 36. Cap screws 38, which may be considered as main fastening members, extend through the clamp bar 36 on each side of the set 32 of main springs, and are threadedly received in seat 26. Each set 32 of main leaf springs is also clamped, at the opposite end, to the seat 30 on the frame by means of a clamp bar 40. Bolts 42 which may also be considered as main fastening members, extend through clamp bar 40, on each side of the set 32 of main springs, and are threadedly received in seat 30. Each set 32 of main springs has thin aluminum spacers 44 inserted between adjacent leaf springs 34 to prevent contact between adjacent springs during operation, and between the end springs and the seats and clamp bars to minimize the stress concentration where the seats and clamp bars cross the surfaces of the springs.

Each set 32 of main leaf springs 34 has a set 46 of auxiliary leaf springs 48 mounted in parallel relation to the set 32. Each of the leaf springs 48 is significantly thinner than the main springs 34. Each set 46 (illustrated with two leaf springs) is clamped, at each end, to the clamp bars 36 and 40 which secure the main set 32 of springs. At one end of leaf springs 46, a cap screw 50 which may be considered an auxiliary fastening member, is received through holes in a clamp block 52, one end of the auxiliary springs 48, spacers 54, and is threadedly engaged in a hole in clamp bar 36. At the opposite end of leaf springs 46, a cap screw 56 which also may be considered an auxiliary fastening member, is received through holes in a clamp block 58, the other end of auxiliary springs 46, spacers 54 and is threadedly engaged in a hole in clamp bar 40. Thus, the auxiliary sets of springs are secured, respectively, to the main sets of springs to act in parallel with the main sets to provide therewith the total spring coupling between the bowl and frame assembly and the base. The vernier springs are subject to bending and torsional deflections similar to the bending and torsional deflections of the main springs. At the same time, the auxiliary set of springs is mounted independently of the main set of springs in that the springs of the auxiliary set of springs is mounted by different bolts than those bolts mounting the main set of springs.

A conventional electromagnetic motor 60 is mounted on the base to drive the frame and container in rotational oscillation about the vertical central axis A. The motor has a core 62 with three upstanding legs 64, and has a coil 66 mounted on the center leg. An armature 68 is secured to the bottom of the frame, in closely spaced relation to the top of the core legs. When an alternating current is supplied to the coil 66, the armature, frame and container oscillate about axis A at a predetermined frequency established by the frequency of the current supplied to the coil.

It is desirable to "tune" the vibratory feeder to bring its torsional natural frequency close to the frequency of the motor. One method of changing the natural frequency of the two-mass feeder system, and the system utilized in the present invention, is to change the stiffness of the resilient means (that is, the main leaf springs 34 and the auxiliary leaf springs 48) by which the frame and container is connected to the base. The stiffer the springs, the higher the natural frequency of the system.

In order to increase the natural frequency of the system, a single auxiliary leaf 48 is added to one or more sets 46 of auxiliary springs, by first removing the cap screws 50, 56 and clamp blocks 52, 58, adding the spring, and replacing the cap screws 50, 56 and clamp blocks. It will be noted that it is not necessary to remove the bolts 38, 42 or the clamp bars 36, 40. Thus, the main springs are not disturbed, and the frame and container remain firmly supported.

It should be noted that the auxiliary leaf springs are considerably thinner than the main leaf springs so that smaller changes can be made in the torsional natural frequency of the system than if main spring leafs were added.

If it is desired to reduce the torsional natural frequency, auxiliary springs are removed from one or more auxiliary sets of springs by removing the cap screws 50, 56 and clamp blocks 52, 58 and replacing them after the leaf spring is removed.

It will thus be seen that the present invention relates to an improved spring system for coupling a two-mass vibratory feeder which will facilitate the fine adjustment of the torsional natural frequency of the feeder (particularly, a large feeder) when the feeder is manufactured or serviced.

Although the best mode contemplated for carrying out the present invention has been herein shown and described, it will be apparent that modification and variation may be made without departing from what is regarded to be the subject matter of the invention.

What is claimed:

1. In an oscillating feeder of the type having a base, a frame, and resilient means to support the frame on the base for oscillating movement with respect to the base, said resilient means including a plurality of sets of main leaf springs mounted between the base and the frame, each set of main leaf springs being secured in position by main fastening members, the improvement comprising at least one set of auxiliary leaf springs mounted between the base and the frame adjacent to and in parallel relation with one of said sets of main springs, and auxiliary fastening members to secure said auxiliary set of leaf springs in position so that individual leaf springs can be added to and removed from said auxiliary set of springs to change the natural frequency of the feeder without loosening the main fastening members.

2. In an oscillating feeder of the type having a resiliently mounted base, a frame, and resilient means to support the frame on the base for oscillating movement with respect to the base, said resilient means including a plurality of sets of main leaf springs, said main leaf springs secured at opposite ends to the base and the frame by main fastening members, the improvement comprising a set of auxiliary leaf springs for each set of main leaf springs, each set of auxiliary leaf springs mounted between the base and the frame, auxiliary fastening members to secure each set of auxiliary spring members adjacent to and in parallel relation to one of the sets of main springs independently of the main fastening members for the adjacent set of main springs to permit individual auxiliary leaf springs to be added to or removed from each set of auxiliary leaf springs and thereby change the natural frequency of the feeder without loosening the main fastening members.

3. In an oscillating feeder of the type having a resiliently mounted base, a frame, and resilient means to support the frame on the base for rotational oscillating movement with respect to the base, said resilient means including a plurality of sets of main leaf springs mounted between the base and the frame in angularly spaced relation, said sets of main leaf springs having clamp bars and main fastening members to secure the ends of said sets of main springs to the base and the frame, respectively, the improvement comprising a set of auxiliary leaf springs for each of said sets of main leaf springs, and auxiliary fastening members to secure the ends of each set of auxiliary leaf springs to the clamp bars securing the ends of one of the sets of main leaf springs to the base and the frame, respectively, whereby the sets of auxiliary leaf springs are secured adjacent to and in parallel relation with but independently of, the sets of main leaf springs, respectively, to permit the addition or removal of individual auxiliary leaf springs to change the natural frequency of the feeder without loosening the main fastening members.

4. In an oscillating feeder of the type having a resiliently mounted base, a frame, and resilient means to support the frame on the base for rotational oscillating movement with respect to the base, said resilient means comprising a plurality of sets of main leaf springs mounted between the base and the frame in angularly spaced relation, the improvement comprising an auxiliary set of leaf springs for each of said primary sets of leaf springs, the leaf springs of said auxiliary sets being smaller than the leaf springs of said main sets, means to mount each of said auxiliary sets of leaf springs parallel to, and independent of, a set of said main leaf springs, each auxiliary set of leaf springs consisting of individual leaf springs which can be added and removed individually from said auxiliary sets to change in increments the natural frequency of said feeder.

5. In an oscillating feeder of the type having a resiliently mounted base, a frame, and resilient means to support the frame on the base for rotational oscillating movement with respect to the base, said resilient means comprising a plurality of sets of main leaf springs, and clamp members to mount each set of main leaf springs between the base and the frame in angularly spaced relation with the other sets of main leaf springs, the improvement comprising an auxiliary set of leaf springs for each of said primary sets of leaf springs, the leaf springs of said auxiliary sets being smaller than the leaf springs of said main sets, means to mount each of said auxiliary sets of leaf springs on the clamp members mounting a set of main leaf spring in parallel relation to the set of main leaf springs, said means for mounting each of said auxiliary sets of leaf springs being removable to permit adjustment of the natural frequency of the frame in small increments by the addition or removal of one or more of the small springs of the auxiliary set without disturbing the set of main springs.

* * * * *